United States Patent
Yano et al.

(10) Patent No.: US 6,231,242 B1
(45) Date of Patent: May 15, 2001

(54) DOUBLE ROW BALL BEARING

(75) Inventors: Shuichi Yano; Yukihiro Akabane, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/433,349

(22) Filed: Nov. 4, 1999

(30) Foreign Application Priority Data

Nov. 17, 1998 (JP) .................................................. 10-326946
Jul. 12, 1999 (JP) .................................................. 11-197891
Sep. 21, 1999 (JP) .................................................. 11-267545

(51) Int. Cl.⁷ .............................. F16C 19/08; F16C 19/54
(52) U.S. Cl. ......................... 384/450; 384/490; 384/510; 384/513
(58) Field of Search ................................... 384/450, 490, 384/510, 512, 513, 516, 491

(56) References Cited

U.S. PATENT DOCUMENTS

| | | | |
|---|---|---|---|
| 4,411,479 | * 10/1983 | Hirata et al. | 384/504 |
| 5,501,530 | * 3/1996 | Nagai et al. | 384/516 |
| 5,556,209 | * 9/1996 | Obara et al. | 384/504 |
| 6,082,906 | * 7/2000 | Satou et al. | 384/516 |
| 6,168,316 | * 1/2001 | Paling et al. | 384/490 |

FOREIGN PATENT DOCUMENTS

| | | | |
|---|---|---|---|
| 1080858 | * 8/1967 | (GB) | 384/516 |
| 2 088 480 | * 6/1982 | (GB) | |
| 53-97701 | 8/1978 | (JP) | |
| 57-6125 | 1/1982 | (JP) | |
| 4-27216 | 3/1992 | (JP) | |
| 9-222122 | 8/1997 | (JP) | |

* cited by examiner

Primary Examiner—David A. Bucci
Assistant Examiner—William C Joyce
(74) Attorney, Agent, or Firm—Sughrue, Mion, Zinn, Macpeak & Seas, PLLC

(57) ABSTRACT

In the double row ball bearing, a plurality of balls are incorporated into a space between a first inner race raceway of an inner race and a first outer race raceway of an outer race, a plurality of balls are incorporated into a space between a second inner race raceway of the inner race and a second outer race raceway of the outer race, there is formed a counterbore portion at least in the outer race raceway of a pair of one-row side inner and outer race raceways, and the balls are incorporated in a maximum manner into a space between the pair of inner and outer race raceways which are so arranged as to include the outer race with the counterbore portion formed therein, to thereby make it possible to provide a double row ball bearing in which the rated load of one-row side raceway thereof can be selected up to its maximum with respect to the outside diameter dimension of an outer race thereof, and an excellent fatigue life can be attained.

4 Claims, 5 Drawing Sheets

DOUBLE ROW BALL BEARING

BACKGROUND OF THE INVENTION

1. Field of the Invention

The present invention relates to a ball bearing and, in particular, to a double row ball bearing suitable for use in an engine cooling water pump in which raceways capable of holding balls are of a double row type and a counter bore is formed in one of two raceways of an outer race. Also, the present invention relates to an improvement in the endurance of the double row ball bearing.

2. Description of the Related Prior Art

FIG. 5 is a partially longitudinal section view of a conventional-type water pump double row ball bearing 30 suitable for use in a water pump which is used to circulate a coolant for an engine of a car. This type of double row ball bearing is disclosed in, for example, Japanese Patent Unexamined Publication No. Hei. 9-22212.

In FIG. 5, in a rotary shaft 31 which corresponds to an inner race, there are formed a first inner race raceway 32 consisting of a groove and a second inner race raceway 33 also consisting of a groove in such a manner that they respectively extend over the whole circumferential direction of the outer peripheral portion of the rotary shaft 31.

On the other hand, in the inner peripheral portion of a substantially cylindrical-shaped outer race 34, there are formed a first outer race raceway 37, which is composed of a groove 35 and a counterbore portion 36 having a linear-shaped cross section, and a second outer race 38 composed of a groove 38 in such a manner that they respectively extend over the whole circumferential direction of the inner peripheral portion of the outer race 34.

The outer race 34 is disposed in such a manner that the center line C thereof is identical with the center line C' of the rotary shaft 31, the first inner race raceway 32 is opposed to the first outer race raceway 37, and the second inner raceway 33 is opposed to the second outer race raceway 38. Also, the shapes and clearances of the first and second raceways are selected in such a manner that they substantially correspond to the shapes of balls 39 to be incorporated between the corresponding raceways and also the ball 39 incorporated between the corresponding raceways are allowed to roll freely there.

The balls 39 are incorporated between the pair of first inner and outer race raceways in the following manner. That is, a plurality of balls 39 are incorporated around the circumferential direction of the first inner and outer race raceways, in more detail, in a so called maximum manner in which as many balls 39 as possible can be incorporated. By the way, the balls 39 are uniformly distributed at a predetermined interval in the circumferential direction thereof and can be held by a tilt-type retainer 40.

On the other hand, between the second inner and outer raceways, there are incorporated balls 41 in the following manner. That is, a plurality of balls 41 are incorporated around the circumferential direction of the second inner and outer raceways, in more detail, the balls 41 are incorporated in a proper number which is smaller than the number of balls 39 to be incorporated into and between the pair of first inner and outer raceways. By the way, the balls 41 can be uniformly distributed at a predetermined interval in the circumferential direction thereof and can be held by a retainer 42.

On the two end portions of the outer race 34 in the center line direction thereof, there are disposed sealing devices 43 and 44 in order not only to prevent leakage of bearing lubricant but also to prevent invasion of liquid into the bearing from the outside. Thus, the portions of the ball bearing 30 where the balls 39 and 41 are incorporated are sealed against the outside by the sealing devices 43 and 44.

The thus structured ball bearing has an advantage that, since the formation of the counterbore portion can increase the number of balls to be incorporated into one row of raceways thereof, the resistance of the present raceways to a radial load can be increased.

By the way, as known well, generally, a rolling bearing is roughly classified into a ball bearing and a roller bearing according to the kinds of rolling elements used. And, normally, there is a tendency that the roller bearing has larger resistance to a rated radial load (which is hereinafter referred to as a rated load) in the axial direction than the ball bearing. Therefore, in the above-mentioned double row ball bearing for a water pump, use of rollers as the rolling elements thereof is preferable from the viewpoint of enhancement in the rated load.

However, when the roller is used as the rolling element, if the rotary shaft is inclined relatively to the outer race, then there is applied an excessive load (which is referred to an edge load) onto and between the end edges of the rolling surfaces of the respective rollers and the outer and inner races, which lowers the fatigue life of the inner and outer races. And, the narrower the width of the outer race is, the easier the edge load is to occur. This deteriorates the ratio of the actual life of the outer race to the calculated life thereof. Therefore, it can be concluded that, especially when the outer race has a short pitch, it is not preferable to use the roller as the rolling element of the rolling bearing.

Thus, it is necessary to employ a double row bearing which uses balls as rolling elements thereof. In this case, as in the water pump double row ball bearing shown in FIG. 5, there may be employed a structure in which a counterbore portion is formed in one of the two outer race raceways to thereby increase the number of balls to be incorporated into the present outer race raceway and thus increase the rated load of that portion.

However, there is a limit to the size of the ball used as the rolling element. For example, even when the number of balls can be increased, if the diameter of each ball is not large to a certain degree, it is impossible to achieve a satisfactory rated load. On the other hand, when the ball diameter is excessively large, the number of balls that can be incorporated decreases, which also deteriorates the rated load of the bearing. Therefore, with employment of this structure, a condition for the replacement of the roller by the ball cannot be satisfied.

SUMMARY OF THE INVENTION

The present invention aims at eliminating the drawbacks found in the above-mentioned conventional double row ball bearings. Accordingly, it is an object of the invention to provide a double row ball bearing which can be used under a high-speed rotation condition and also in which the rated load of one row side raceways of the double row raceways thereof can be selected up to its maximum with respect to the outside diameter dimension of an outer race thereof or with respect to the raceway diameter dimension of the outer race and also an excellent fatigue life can be attained.

The above object can be achieved by a double row ball bearing, according to the invention , comprising:

an inner race having first and second inner race raceways on its outer peripheral surface; an outer race having first and second outer race raceways on its inner peripheral surface; and a plurality of freely rolling balls respectively incorporated into a space between the first inner race raceway of the inner race and the first outer race raceway of the outer race as well as into a space between the second inner race raceway of the inner race and the second outer race raceway of the outer race, wherein the number of balls to be incorporate into a space between the pair of first outer race raceway and first inner race raceway is different from the number of balls to be incorporated into a space between the pair of second outer race raceway and second inner race raceway; and, in one of the outer race raceways, which is located on one row side where a larger number of balls are incorporated, there is formed a counterbore portion, and, into a space between the pair of inner and outer race raceways so arranged as to include the outer race raceway with the counterbore portion formed therein, the balls are incorporated in a maximum manner, wherein the diameter of balls to be incorporated into a space between the pair of inner and outer race raceways including the outer race raceway with the counterbore portion formed therein is 22%–25% of the outside diameter dimension of the outer race.

According to the invention as set forth in the present invention, since the diameter of balls is 22%–25% of the outside diameter dimension of the outer race, the rated load value can be selected up to its maximum with respect to the outside diameter of the outer race and thus an excellent fatigue life can be attained. And, because the balls are used as the rolling elements of the bearing, not only the lubrication life of the bearing is long but also, even if the outer race thereof is a short-pitch product, there is no fear for occurrence of an edge load.

In addition, the above-mentioned object can also be achieved by a double row ball bearing, according to the present invention, comprising:

an inner race having first and second inner race raceways on its outer peripheral surface, an outer race having first and second outer race raceways on its inner peripheral surface, and a plurality of freely rolling balls respectively incorporated into a space between the first inner race raceway of inner race and the first outer race raceway of the outer race as well as into a space between the second inner race raceway of the inner race and the second outer race raceway of the outer race, wherein the number of balls to be incorporate into a space between the pair of first outer race raceway and first inner race raceway is different from the number of balls to be incorporated into a space between the pair of second outer race raceway and second inner race raceway; and, in one of the outer race raceways, which is located on one row side where a larger number of balls are incorporated, there is formed a counterbore portion, and, into a space between the pair of inner and outer race raceways so arranged as to include the outer race raceway with the counterbore portion formed therein, the balls are incorporated in a maximum manner, wherein the diameter of balls to be incorporated into a space between the pair of inner and outer race raceways including the outer race raceway with the counterbore portion formed therein is 25%–28% of the outer race raceway diameter dimension of the outer race.

According to the ball bearing according to the present invention, since the diameter of balls is 25%–28% of the raceway diameter of the outer race, the rated load value can be selected up to its maximum with respect to the raceway diameter dimension of the outer race and thus an excellent fatigue life can be attained. And, because the balls are used as the rolling elements of the bearing, not only the lubrication life of the bearing is long but also, even if the outer race thereof is a short-pitch product, there is no fear for occurrence of an edge load.

The present disclosure relates to subject matter contained in Japanese Patent Applications Nos. Hei. 10-326946 filed on Nov. 17, 1998, Hei. 11-197891 filed on Jul. 12, 1999 and Hei. 11-267545 filed on Sep. 21, 1999, and which is expressly incorporated herein by reference in its entirety.

DETAILED DESCRIPTION OF THE PREFERRED EMBODIMENT

Figure 1:
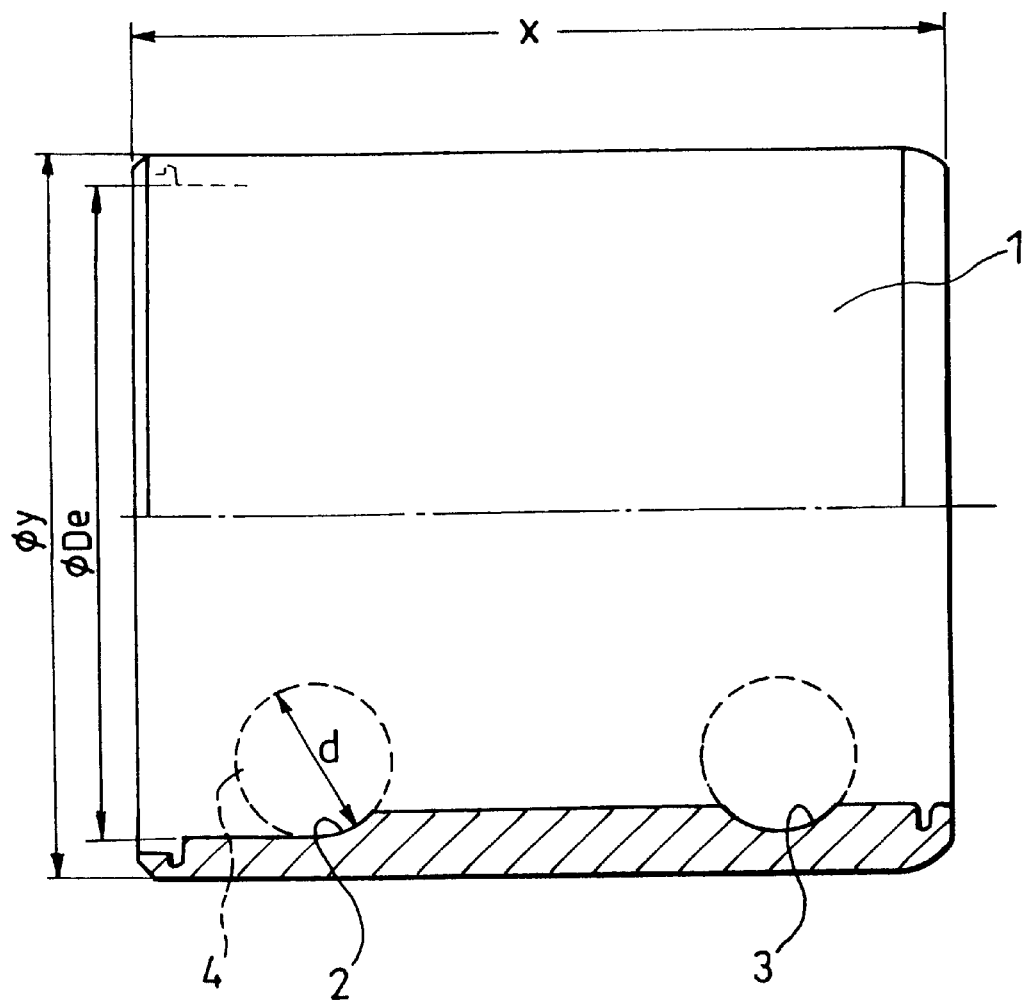
FIG. 1 is a partially longitudinal section view of an outer race (which is a short-pitch product) employed in a double row ball bearing.

Now, description will be given below in detail of an embodiment of a double row ball bearing according to the invention with reference to the accompanying drawings. FIG. 1 is a partially longitudinal section view of an outer race 1 employed in the double row ball bearing according to the embodiment of the invention. However, to make a clear contrast with a conventional type bearing, the outer race 1 is assumed that it has a shape which can correspond to the outer race of the above-mentioned conventional bearing shown in FIG. 5. In the present embodiment, the remaining portions thereof that are not described herein are the same as those employed in the above-mentioned conventional bearing.

Figure 5:
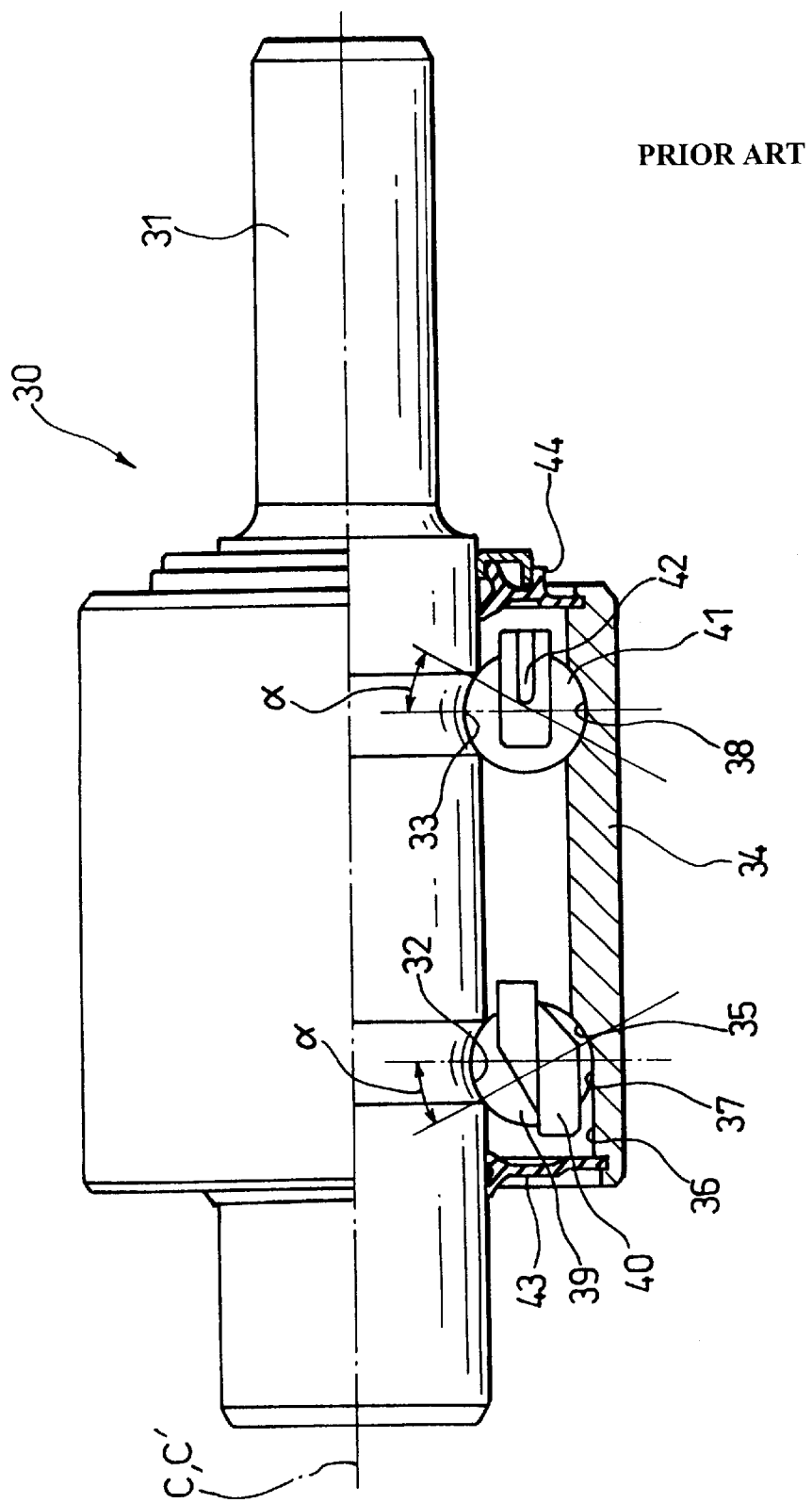

Also, first and second outer race raceways 2 and 3, which are portions for forming raceways for the rolling elements of the bearing, are designed in such a manner that they correspond to the diameters of balls to be incorporated into the first and second outer race raceways 2 and 3. In the present embodiment, into the first outer race raceway 2, there are incorporated balls 4 each having a diameter of d. By the way, it is not always necessary that the diameter of a ball to be incorporated into the first outer race raceway 2 is equal to the diameter of a ball to be incorporated into the second outer race raceway 3. Also, in the present embodiment, as shown in FIG. 5, a contact angle α is given to each row. This increases a position of an operating point, which makes it possible to gain an ascendancy over a moment load to be applied to the bearing.

Figure 2:
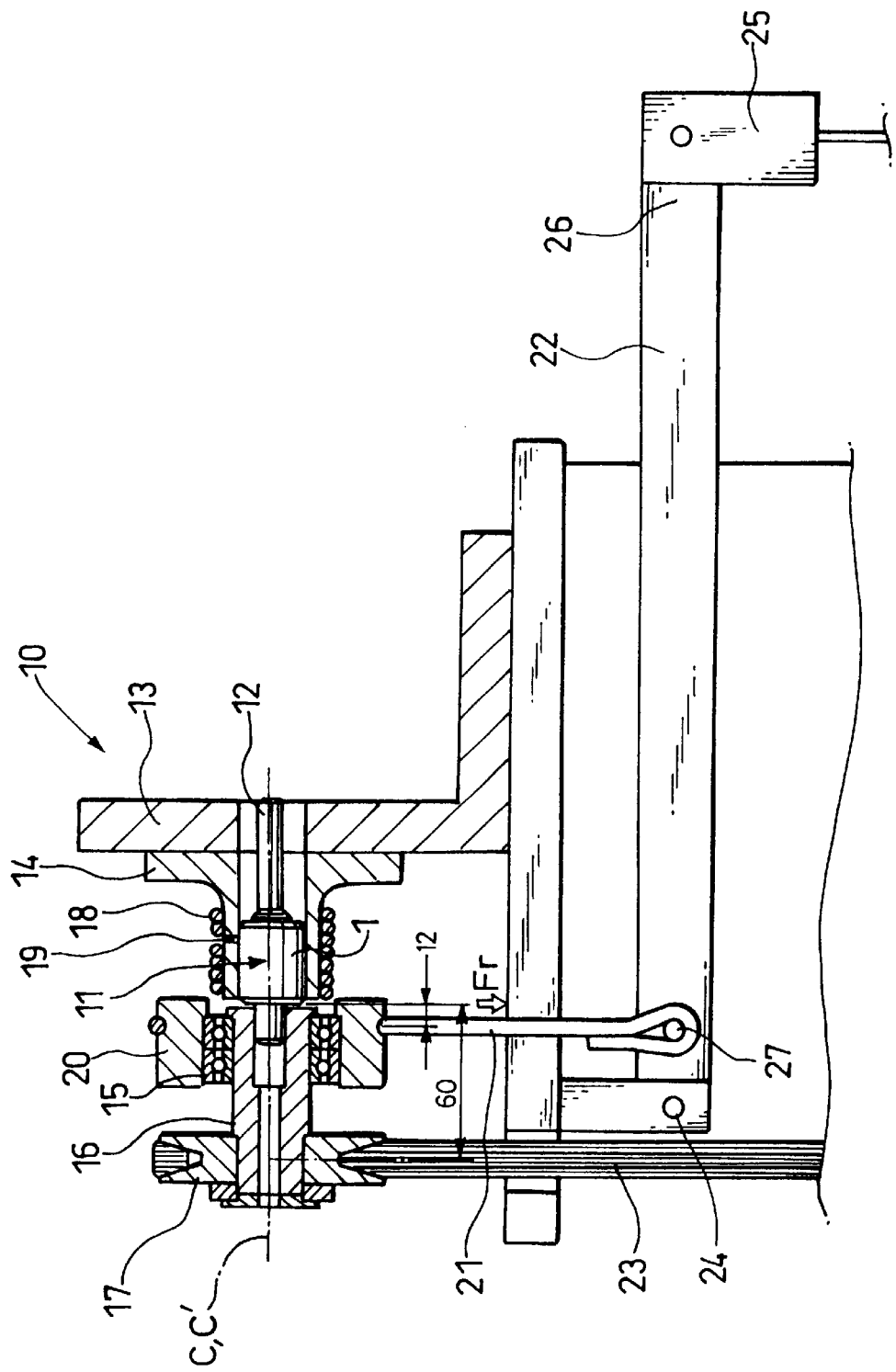
FIG. 2 is a partially longitudinal section view of a tester which is used to change the diameters of balls employed in a bearing including such outer race as shown in FIG. 1 to thereby measure the fatigue life of the bearing.

Now, FIG. 2 is a partially longitudinal section view of a tester 10 for testing the fatigue life of a double row bearing 11. On account of testing convenience, it is necessary to use double row bearings which are different in the diameter of balls employed therein. Therefore, of course, the double row bearing 11 can be removed from the tester 10.

As can be seen clearly from FIG. 2, an outer race 1 of the double row bearing 11 is fitted with a housing 14 mounted on a hold base 13, while a rotary shaft 12 corresponding to an inner race, in one end portion thereof, is fitted with the inner surface of an auxiliary rotary body 16 supported on an auxiliary bearing 15 which is a split-type double row bearing. Thus, the rotary shaft 12 can be rotated together with the auxiliary rotary body 16. Also, the auxiliary rotary body 16 is formed in a substantially cylindrical shape which extends in the longitudinal direction thereof in FIG. 2: one end of the auxiliary rotary body 16, as described above, is combined with the inner race of the auxiliary bearing 15 and rotary shaft 12; and, the other end thereof is connected to a drive pulley 17 which serves as a rotation drive source in the present tester 10. Further, on the periphery of the housing 14, there are equipped heating apparatus 18 and a thermocouple 19 which are respectively used to control temperature conditions during testing.

The auxiliary bearing 15, in particular, an outer race thereof is fitted with a support body 20. On the support body 22, there is disposed tracting mechanism 21 which is to be connected to a load transmission member 22. The loading position of a load Fr given by the tracting mechanism 21 in the longitudinal direction thereof is set in such a manner that its offset distance from the end portion of the outer race 1 provides 12 mm.

The thus structured tester 10 is now started to conduct a test on the double row bearing as to the fatigue life thereof. That is, at first, a drive source (not shown) drives the drive pulley 17 to thereby rotate the rotary shaft 12. Referring here to the loading method of the load Fr, originally, a belt load due to the tensile force of a pulley belt 23 is to be applied to the rotary shaft of a double row rolling bearing for a water pump; however, in the present tester 10, to control the value of the belt load, the load Fr is applied by the tracting mechanism 21, load transmission member 22, and a load generator device 25. In other words, the load generator device 25 moves the vicinity of the force point end 26 of the load generator device 25 in the downward direction in FIG. 2 to thereby rotate the load transmission member 22 about a fulcrum portion 24, whereby an operating point portion 27 is moved in the downward direction in FIG. 2 and thus the load Fr directed in the downward direction in FIG. 2 can be applied to the tracting mechanism 21 mounted on the operating point portion 27. And, a load is applied through a support body 20 to the auxiliary bearing 15 and, in response to this, the load Fr is applied to the auxiliary rotary body 17, whereby loads are respectively applied to the rotary shaft 12, balls and raceways of the double row bearing 11.

Figure 3:
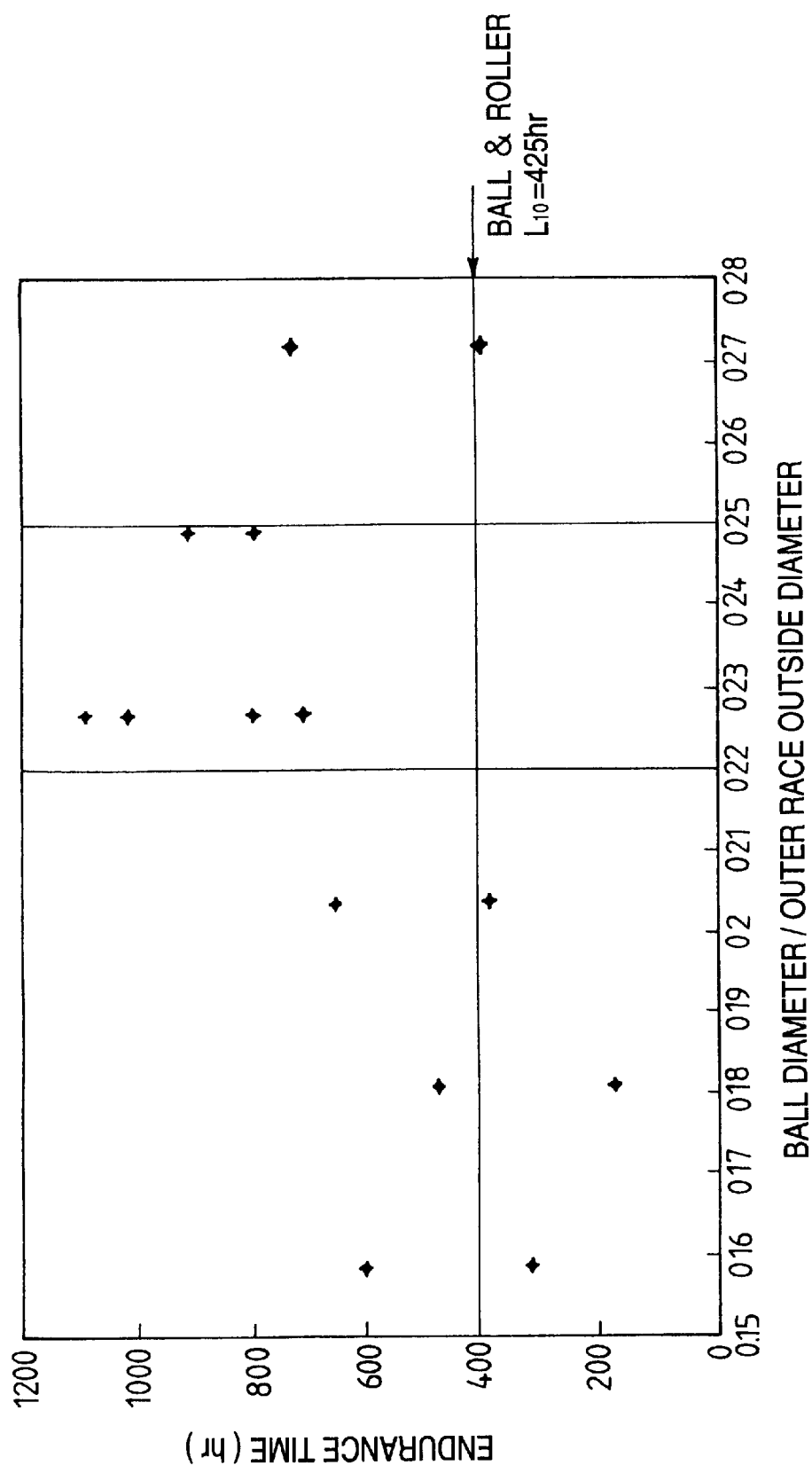
FIG. 3 is a graphical representation of the results obtained by a test conducted using the tester shown in FIG. 2.
Figure 4:
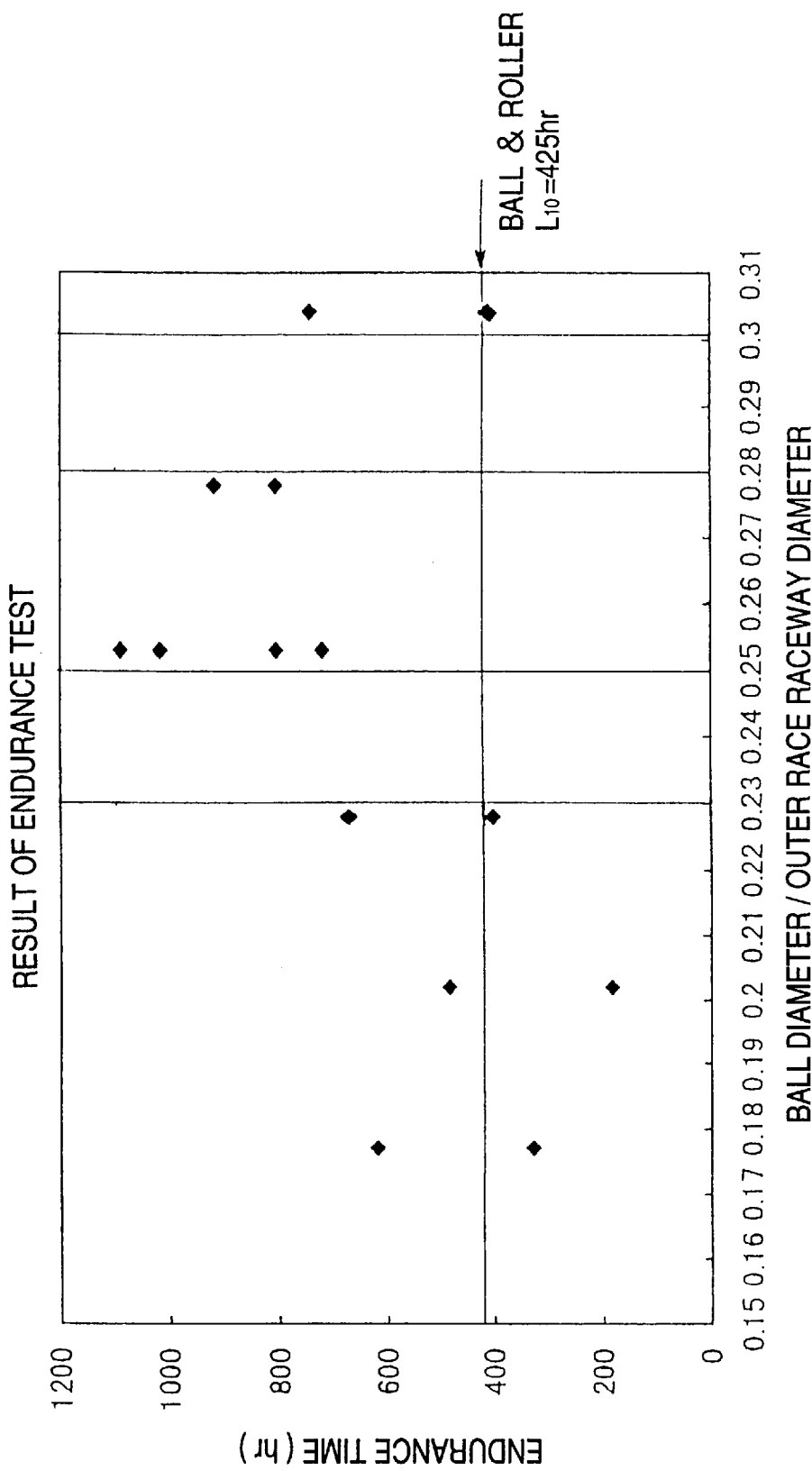
FIG. 4 is also a graphical representation of the results obtained by a test conducted using the tester shown in FIG. 2; and, FIG. 5 is a partially longitudinal section view of a conventional type double row ball bearing for use in a water pump.

Now, FIGS. 3 and 4 respectively show results which are obtained when a test has been conducted on the double row bearing 11 using the tester 10 shown in FIG. 2. The test is conducted under the following condition: that is, the highest rotation number is 6000 rpm, the highest temperature of the tester is 100° C., and the maximum value of the load Fr is 200 kgf. And, as described above, the offset distance of the loading position from the outer race is 12 mm, an unbalance amount is 40g, and the offset distance of an unbalance position is 60 mm.

Also, referring to the double row bearing 11 to be set on the tester 10, in the case of a test shown in FIG. 3, the outside dimensions of the outer race 1 are such that outer race length x =38.89 mm and outer race outside diameter y =35.00 mm; and, for balls to be incorporated into the above-mentioned first outer race raceway 2, there are prepared balls which are different in the diameter d from one another in the number that corresponds to the number of balls to be measured or tested. And, in the case of a test shown in FIG. 4, the outside dimensions of the outer race 1 are such that outer race length x =38.89 mm and outer race raceway diameter De =31.372 mm; and, for balls to be incorporated into the above-mentioned first outer race raceway 2, there are prepared balls which are different in the diameter d from one another in the number that corresponds to the number of balls to be measured or tested. By the way, in the test shown in FIG. 4, the thickness of the outer race (thickness =(outside diameter −outer race raceway diameter) /2 is set to the smallest thickness that can stand the load. Also, in common with the two tests, the highest value of the load Fr is set at 200 kgf. Also, in the tests respectively shown in FIGS. 3 and 4, the first outer race raceway 2 shown in FIG. 1 is arranged on the drive side (that is, on the pulley 17 side).

At first, description will be given below of FIG. 3. In FIG. 3, its horizontal axis represents a ratio of the ball diameter dimension of balls to be incorporated into the first outer race raceway 2 to the outside diameter dimension of the outer race (which is hereinafter referred to as a ratio of ball diameter/outer race outside diameter), and its vertical axis represents the endurance time (unit hr) of the bearing. In FIG. 3, $L^{10}$=425 hr means the endurance times, that is, the so called rated lives with a reliability of 90% of rolling bearings respectively using balls and rollers in combination that are obtained when they are set in the tester 10 and tested or measured by the tester 10 under the same test conditions.

Next, description will be given below of the results of the test conducted on these rolling bearings by the tester 10. The plotting of the measured values is given using at least two measured values with respect to the same test condition and the same ratio of ball diameter/outer race outside diameter. The reason for this is as follows: that is, even if bearings looking seemingly the same are rotated under the same external condition, the fatigue lives thereof vary to a considerable degree; and, therefore, several measured values must be compared with one another to obtain a reliable value.

For the ratios of ball diameter/outer race outside diameter in the range of 0.15–0.22, the endurance times corresponding to these ratios are approx. 190–680 hrs. Referring to this results, in some cases, there is obtained a better result than a bearing using balls and rollers in combination, but the thus obtained value is not a stable value; and much less, even under the same ratio of ball diameter/outer race outside diameter condition, the results vary in the range of 300 hrs. and, in some cases, the obtained value falls below 425 hrs. That is, for the ratios of ball diameter/outer race outside diameter in the range of 0.15–0.22, there cannot be obtained such values that can be used practically. This also applies similarly to the ratios of ball diameter/outer race outside diameter that exceed 0.25.

Accordingly, let us turn our attention to the ratios of ball diameter/outer race outside diameter in the range of 0.22 –0.25. It is true that, even in this range, the measured values obtained under the same condition vary, but the variation in this range is smaller than those in the other ranges, and, moreover, when compared with the endurance time, $L^{10}$= 425 hrs., of the bearing of a type using balls and rollers in combination, there can be attained a sufficiently long endurance time. Thus, it can be well said that the measured values in this range are sufficiently practicable values.

Therefore, in designing a double row rolling bearing for a water pump, if the diameters of balls to be incorporated into the rolling element raceway on the drive side or on the side where a radial load or a moment load is applied more than the remaining sides, that is, the diameters of balls to be incorporated into the raceway side where the balls are incorporated in a maximum manner are in the range of ball diameter/outer race outside diameter ratios of 0.22–0.25 (22%–25%), it is possible to supply a bearing which provides not only sufficient load resistance but also a sufficient fatigue life. And, since the balls are used as the rolling elements of the bearing, the bearing can provide a long lubrication life and also, even if the outer race thereof is a short-pitch product, there is no fear for occurrence of the edge load.

Next, description will be given below of FIG. 4. In FIG. 4, its horizontal axis represents a ratio of the ball diameter dimension of balls to be incorporated into the first outer race raceway 2 to the outer race raceway diameter dimension of the outer race (which is hereinafter referred to as a ratio of ball diameter/outer race raceway diameter), and its vertical axis represents the endurance time (unit hr) of the bearing.

Then, description will be given below of the results of the test conducted on these rolling bearings by the tester 10. For the same reason as in the test in FIG. 3, the plotting of the measured values is given using at least two measured values with respect to the same test condition and the same ratio of ball diameter/outer race raceway diameter.

For the ratios of ball diameter/outer race raceway diameter in the range of 0.17–0.25, the endurance times corresponding to these ratios are approx. 190–680 hrs. Referring to this results, in some cases, there is obtained a better result than a bearing using balls and rollers in combination, but the thus obtained value is not a stable value; and much less, even under the same ball diameter/outer race outside diameter condition, the results vary in the range of 300 hrs. and, in some cases, the obtained value falls below 425 hrs. That is, for the ratios of ball diameter/outer race outside diameter in the range of 0.17–0.25, it is not possible to obtain such values that can be used in practical cases. This also applies similarly to the ratios of ball diameter/outer race raceway diameter that exceed 0.28.

Accordingly, let us turn our attention to the ratios of ball diameter/outer race raceway diameter in the range of 0.25 –0.28. Even in this range, the measured values obtained under the same condition truly vary, but the variation in this range is smaller than those in the other ranges, and, moreover, when compared with the endurance time, $L^{10}$ =425 hrs., of the bearing of a type using balls and rollers in combination, there can be attained a sufficiently long endurance time. Thus, it can be well said that the measured values in this range can be used as sufficiently practicable values.

Therefore, in designing a double row rolling bearing for a water pump, if the diameters of balls to be incorporated into the rolling element raceway on the drive side or on the side where a radial load or a moment load is applied more than the remaining sides, that is, the diameters of balls to be incorporated into the raceway side where the balls are incorporated in a maximum manner are in the range of ball diameter/outer race raceway diameter ratios of 0.25–0.28 (25%–28%), it is possible to supply a bearing which provides not only sufficient load resistance but also a sufficient fatigue life. And, since the balls are used as the rolling elements of the bearing, the bearing can provide a long lubrication life and also, even if the outer race thereof is a short-pitch product, there is no fear for occurrence of the edge load.

By the way, the present invention is not limited to the above-mentioned embodiments but various changes and improvements are also possible. For example, the invention can also apply to other double row bearings which are requested to have equivalent performance to a bearing for a water pump with respect to high-speed rotation and/or high load. Also, the invention can further apply to a double row bearing using an outer race which is not a short-pitch product.

As has been described heretofore, in a double row bearing according to the invention, since the diameter dimension of balls to be incorporated into a raceway including a counterbore portion is in the range of 22%–25% of outer race outside diameter dimension or in the range of 25%–28% of outer race raceway diameter dimension, the rated load of the bearing can be set at its maximum value with respect to the outer race dimension and also an excellent fatigue life can be provided. Further, since the balls are used as the rolling elements of the bearing, the bearing can enjoy a long lubrication life and, even if the outer race of the bearing is a short-pitch product, there is no fear for occurrence of an edge load.

While there has been described in connection with the preferred embodiment of the invention, it will be obvious to those skilled in the art that various changes and modifications maybe made therein without departing from the invention, and it is aimed, therefore, to cover in the appended claim all such changes and modifications as fall within the true spirit and scope of the invention.

What is claimed is:

1. A double row ball bearing, comprising:

an inner race having first and second inner race raceways on its outer peripheral surface;

an outer race having first and second outer race raceways on its inner peripheral surface; and a plurality of freely rolling balls respectively incorporated into a space between said first inner race raceway of said inner race and said first outer race raceway of said outer race and into a space between said second inner race raceway of said inner race and said second outer race raceway of said outer race; and a couterbore portion provided in the first one of said outer race raceways, wherein said balls are incorporated in a maximum manner into the space between said first outer race raceway and said first inner race raceway, and wherein the diameter dimension of each ball to be incorporated in the maximum manner into the space between said first outer race raceway and said first inner race raceway is in the range from 22% to 25% both inclusive of an outside diameter dimension of said outer race.

2. The double row ball bearing according to claim 1, wherein the number of balls to be incorporated into the space between said first outer race raceway and said first inner race raceway is larger than the number of balls to be incorporated into the space between said second outer race raceway and said second inner race raceway.

3. A double row ball bearing, comprising:

an inner race having first and second inner race raceways on its outer peripheral surface;

an outer race having first and second outer race raceways on its inner peripheral surface; and a plurality of freely rolling balls respectively incorporated into a space between said first inner race raceway of said inner race aid said first outer race raceway of said outer race and into a space between said second inner race raceway of said inner race and said second outer race raceway of said outer race; and a couterbore portion provided in the first one of said outer race raceways, wherein said balls are incorporated in a maximum manner into the space between said first outer race raceway and said first inner race raceway, and wherein the diameter dimension of each ball to be incorporated in the maximum manner into the space between said first outer race raceway and said first inner race raceway is in the range from 25% to 28% both inclusive of an outer race raceway diameter dimension of said outer race.

4. The double row ball bearing according to claim 3, wherein the number of balls to be incorporated into the space between said first outer race raceway and said first inner race raceway is larger than the number of balls to be incorporated into the space between said second outer race raceway and said second inner race raceway.

* * * * *